June 17, 1958    G. M. SLOCOMB    2,839,744
NON-LINEAR ANALOG-TO-DIGITAL CONVERTER
Filed Oct. 1, 1956    2 Sheets-Sheet 2

INVENTOR.
GEORGE M. SLOCOMB
BY
Christie, Parker & Hale
ATTORNEYS

United States Patent Office 2,839,744
Patented June 17, 1958

2,839,744

NON-LINEAR ANALOG-TO-DIGITAL CONVERTER

George M. Slocomb, Altadena, Calif., assignor to Consolidated Electrodynamics Corporation, Pasadena, Calif., a corporation of California Application October 1, 1956, Serial No. 613,151

4 Claims. (Cl. 340—347)

This invention relates to apparatus for converting information between digital and analog forms and, more particularly, is concerned with apparatus for providing a non-linear relationship between the digital and analog quantities involved in the conversion.

Circuits are well known by means of which digital information may be converted to an analog voltage wherein the voltage is directly proportional to the numerical value of the digital information. This may be accomplished, for example, in the manner described in my co-pending application, Serial No. 593,528, filed June 25, 1956. Such converter circuits furthermore may be used as part of a feed-back loop whereby the analog voltage output is compared with an analog voltage to be measured and the digital number varied until the two analog voltages are equal, in which case the resulting digital number is a measure of the analog voltage input.

Sometimes it is useful in control systems in which the response of a controlled element is a non-linear function of its control stimulus to effect a non-linear relationship between the digital number and the analog voltage. Thus, it may be desirable to convert the analog signal derived from a thermocouple to an equivalent digital manifestation and to correct for any non-linearity of the thermocouple. Heretofore, corrections for non-linearities in the analog signal source have been applied directly to the signal itself, as, for example, by driving a non-linear potentiometer by means of a follow-up servo arrangement, the non-linear potentiometer being designed to exactly compensate for the non-linearities of the thermocouple source.

The present invention provides a converter circuit which may be adjusted to correct for such non-linearities in the signal source without sacrifice of speed, as in the case of the mechanically driven potentiometer in follow-up servo. The present invention does not materially affect the complexity of the circuit, and yet retains all the speed, long life and accuracy of such known linear types of converter circuits, such as that described in my above-mentioned co-pending application.

This is accomplished in the present invention by means of a modified digital-to-analog converter of the familiar relay adder type, which circuit may also be used as part of the feed-back loop in an analog-to-digital converter. The digital-to-analog portion of the converter circuit includes a most significant digit decade adder which is responsive to the most significant decimal digit of a number stored in digital form on a conventional counter circuit. The decade adder includes ten variable resistors which are selectively connected to a positive potential source or to ground, as determined by the digit value of the most significant digit in the number. Each of these variable resistors is coupled to a common output terminal where the output analog voltage is derived. The variable resistors are adjusted to provide a ten-point approximation to the desired non-linear output voltage function.

Additional lower order digit adders are provided for each of the remaining digits in the decimal number to be converted. Each of the lower order adders is coupled to the output through a variable attenuator which includes ten variable resistors which are respectively selected for each of the ten resistors selected in the most significant digit decade adder. The attenuator adjusts the incremental changes of output voltage with changes in the lower order digits of the input number, so as to provide a substantially uniform transition with changes in the most significant digit.

For a better understanding of the invention reference should be had to the accompanying drawing, wherein.

Figure 1:
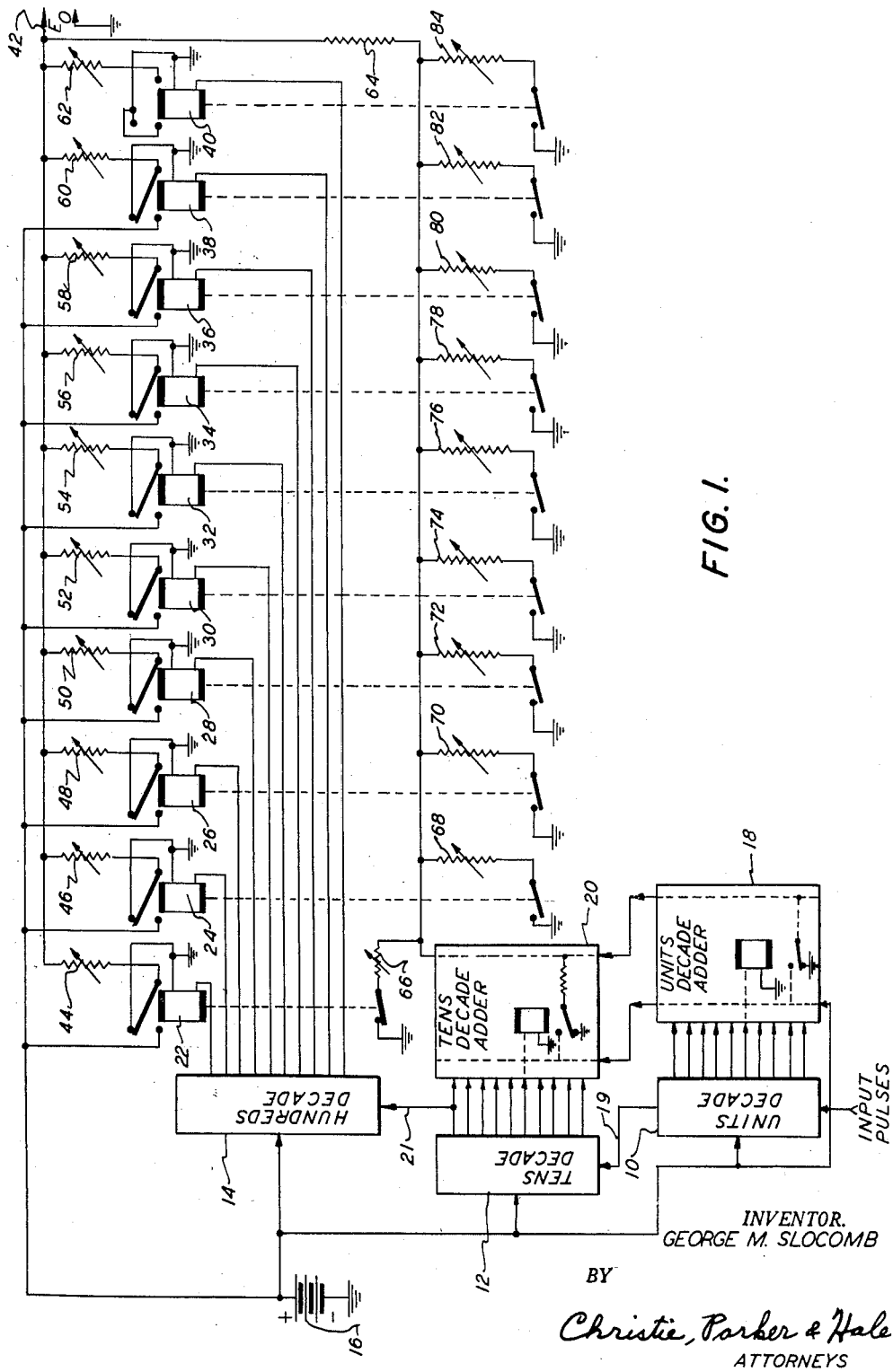
Fig. 1 is a schematic diagram of the non-linear digital-to-analog converter circuit of the present invention.

Referring to Fig. 1 in detail, the non-linear digital-to-analog circuit is shown as including a counter having a units decade 10, a tens decade 12, and a hundreds decade 14. These decades may comprise familiar relay-operated stepping switches of a type which are stepped through ten separate output circuits in response to ten pulses applied thereto. Thus, the units decade 10 is pulsed by input pulses derived from a digital information source which produces a number represented by a series of consecutive pulses. The units decade 10 connects a D.-C. source, such as indicated by the battery 16, to one of ten output lines which are coupled to a units decade adder circuit indicated generally at 18.

Every time the units decade stepping switch 10 is stepped through to its tenth position it produces a pulse which is fed to the tens decade 12 by the output line 19. Thus, the tens decade 12 is stepped through its tenth output position by one hundred input pulses applied to the units decade 10. The ten output lines of the tens decade 12 are thereby successively coupled to the battery 16, the output lines being coupled to a similar tens decade adder circuit indicated generally at 20.

The tenth output line 21 from the tens decade 12 is coupled to the hundreds decade 14 whereby every tenth pulse applied to the tens decade actuates the hundreds decade 14. In this manner one thousand input pulses are required to step the stepping switch comprising the hundreds decade 14 through its tenth position.

The output of the hundreds decade 14 comprises ten lines which are connected respectively to ten relay coils indicated generally at 22, 24, 26, 28, 30, 32, 34, 36, 38 and 40. The stepping switch comprising the hundreds decade 14 operates to successively connect the relays 22 through 40 across the battery 16. Each of the relays in the hundreds decade adder operates a relay switch which normally connects one output terminal, indicated at 42, through a variable resistor, such as indicated respectively at 44, 46, 48, 50, 52, 54, 56, 58, 60 and 62, selectively to a ground potential or to the D.-C. supply 16. If the source 16 is of substantially zero impedance, the impedance of the adder circuit as seen from the load across the output terminals at 42 is a constant regardless of the condition of the relay-operated switches, namely, the resulting impedance of the ten resistors 44 through 62 connected in shunt. This being so, the variable resistors can be adjusted individually to values which will produce any pre-selected incremental changes in output voltage as the hundreds decade stepping switch 14 is caused to step through its ten positions.

Figure 3:
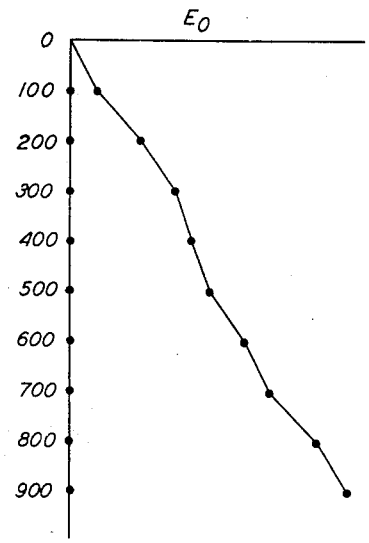
Fig. 3 is a plot of the analog voltage output as a function of the numerical digital input of the circuit of Fig. 1.

Referring to Fig. 3, there is shown a typical ten-point curve representing the ten different increments of voltage which appear across the output in response to shifting of the stepping switch in the hundreds decade 14. It will be appreciated that if the output is to go to zero with one particular step of the hundreds decade 14, that no relay need be provided for that step, since in order to get zero output voltage, all the variable resistors should be coupled simultaneously to ground.

The units decade 10 and the tens decade 12 operate the units decade adder 18 and the tens decade adder 20, respectively. The adders 18 and 20 may be identical to the above described decade adder driven by the hundreds decade stepping switch 14. However, since the two adders provide a linear relationship between the output potential and the number of input pulses, the several resistors comprising the stages of the adders need not be variable but may be pre-set to the proper value to give such linear relationship.

The two adders are connected in tandem to the output terminal 42 through a summing resistor 64 which acts to isolate the units and tens decade adders 18 and 20 from the hundreds decade adder controlled by the stepping switch decade 14. Thus, incremental voltage steps are produced at the output for each input pulse supplied to the units decade switch 10. These small incremental steps are added on to the voltage produced at the output in response to the hundreds decade 14.

Since the large incremental voltage steps produced by the hundreds decade 14 are not equal but are of varying magnitude as determined by the settings on the variable resistors in the associated decade adder, the input pulse which results in a stepping of the hundreds decade 14 may produce an incremental step at the output which is substantially different in magnitude than the incremental steps produced by other input pulses. For this reason a variable attenuator is provided which comprises ten variable resistors as indicated at 66, 68, 70, 72, 74, 76, 78, 80, 82 and 84. These resistors are selectively connected to ground by relay operated switches which are respectively controlled by the relay coils 24 through 40.

It will be seen that for each position of the stepping switch in the hundreds decade 14 there will be a different amount of attenuation of the output from the units and tens decades 18 and 20, by virtue of the selected attenuating resistor. By proper adjustment of the variable resistors 66 through 84, it is possible to adjust the resulting incremental steps produced at the output by the stepping of the units decade adder 18 and the tens decade adder 20 for a given setting of the stepping switch of the hundreds decade 14 so that a substantially smooth or even transition can be made with each input pulse that steps the hundreds decade stepping switch. In other words, the changes in output voltage produced by stepping of the units decade and the tens decade may be adjusted to conform with the slope of the line connecting adjacent points, as shown in Fig. 3, wherein the points represent the output voltage corresponding to successive steps of the hundreds decade 14.

Figure 2:
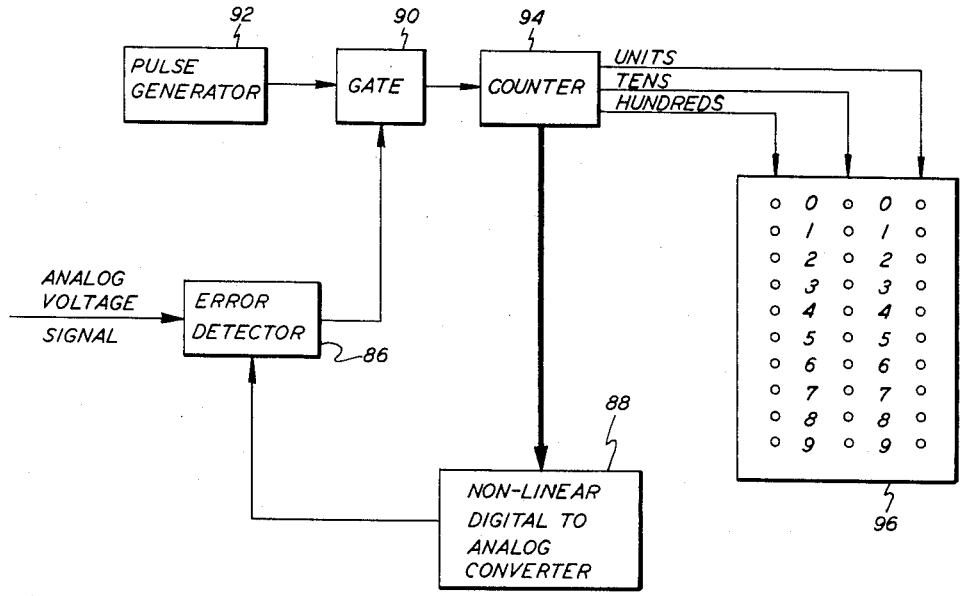
Fig. 2 is a block diagram of an analog-to-digital converter utilizing the circuitry of Fig. 1.

A typical application of the above-described non-linear digital-to-analog circuit is shown in Fig. 2. Fig. 2 shows in block diagram form a circuit for converting an analog voltage signal to a visual representation in digital form. Thus, an analog voltage signal derived, for example, from a thermocouple, a flow metering device, or any other similar source of varying D.-C. voltage, is supplied to an error detector circuit 86. The error detector circuit may be a differential amplifier or other suitable circuit for deriving an output which has a magnitude and polarity indicative of the difference between two input voltages, one of which is the analog voltage signal to be measured. The other signal applied to the error detector 86 is derived from a non-linear digital-to-analog circuit 88 corresponding to the circuit described above in connection with Fig. 1.

The output from the error detector circuit 86 is coupled to and operates a gate circuit 90 to which is coupled a pulse generator 92. Whenever an error signal is developed by the detector 86, the output of the error detector circuit 86 is arranged to gate open the gate circuit 90 whenever an error signal of a predetermined polarity is produced by the error detector 86, that is, when the analog voltage signal is greater than the output voltage derived from the non-linear digital-to-analog circuit 88.

With the gate circuit 90 gated open, pulses from the pulse generator 92 are passed to a counter 94. The counter 94, as previously described in connection with Fig. 1, may consist of three ten-position stepping switches comprising a units decade, a tens decade and a hundreds decade, where data is to be resolved in three-digit numbers. The counter 94 and digital-to-analog circuit 88 together comprise the circuit above described in connection with Fig. 1.

Thus, it will be seen that in operation with an analog voltage applied to the input of the error detector 86, the gate 90 is initially opened permitting pulses from the pulse generator 92 to pass through the counter 94. The counter 94 is caused to count in response to the input pulses producing an increasing voltage at the output of the non-linear digital-to-analog converter circuit 88 which is balanced against the input voltage signal in the error detector 86. When the output of the non-linear digital-to-analog converter circuit 88 is substantially equal to the input analog voltage signal, the gate 90 is closed. Counter 94 at this time has assumed a count which is directly related to the value of the analog voltage signal applied to the error detector 86. The relationship between the count and the magnitude of the input analog voltage signal is determined by the non-linear relationship of the converter 88. Thus, any non-linear response characteristic of the transducer supplying the analog voltage signal may be compensated for or corrected by means of the non-linear digital-to-analog circuit 88, such that the ultimate count established on the counter 94 is a direct indication of the true value of the quantity being measured by the transducer element, such as a true temperature being measured by a thermocouple.

The respective decade stepping switches in the counter 94 may be utilized to drive suitable indicating means, such as a visual indicator as indicator generally at 96. Such visual indicator circuits are well known and generally involve volumns of ten neon bulbs, each column representing a different digit in the number to be represented. One light is lit in each column according to the ultimate count established on the counter 94, and thus the established count can be read off by the bulbs as lit on the visual indicator 96.

I claim:

1. A converter for producing a voltage across a pair of output terminals that is a non-linear function of a multiple digit input number manifestation, said apparatus comprising a first group of ten variable resistors, each connected at one end to one of the output terminals, a low impedance source of potential having one end connected to the other of the output terminals, switching means for selectively coupling the respective resistors to one or the other of the two ends of the potential source in response to the value of the most significant digit of said multiple digit number manifestation, a plurality of additional groups of resistors including one group for each of the remaining digits of said input number manifestation, a summing resistor coupling one end of each of the resistors in said additional groups to said one of the output terminals to which the first group of resistors are connected, means for selectively coupling the respective resistors of said additional groups to one or the other of the two ends of the potential source in response to the value of the remaining digits of said multiple digit number manifestation, attenuator means including ten variable resistors and switching means for connecting selected ones of the respective resistors in shunt between said other of the output terminals connected to the one end of the potential source and the common junction between the summing resistor and said additional groups of resistors, and means for activating said last-named switching means to selectively couple a particular shunting resistor in response to the value of the most significant digit of said multiple digit number manifestation.

2. A converter for producing a voltage across a pair of output terminals that is a non-linear function of a multiple digit input number manifestation, said apparatus comprising a first group of ten variable resistors connected at one end to one of the output terminals, a low impedance source of potential having one end connected to the other of the output terminals, switching means for selectively coupling the respective resistors to one or the other of the two ends of the potential source in response to the value of the most significant digit of said multiple digit number manifestation, a plurality of additional groups of resistors including one group for each of the remaining digits of said input number manifestation coupling one end of each of the resistors in said additional groups to said one of the output terminals to which the first group of resistors are connected, means for selectively coupling the respective resistors of said additional groups to one or the other of the two ends of the potential source in response to the value of the remaining digits of said multiple digit number manifestation, attenuator means including ten variable resistors and switching means for connecting selected ones of the respective resistors in shunt between said other of the output terminals connected to the one end of the potential source and the common junction between said additional groups of resistors, and means for activating said last-named switching means to selectively couple a particular shunting resistor in response to the value of the most significant digit of said multiple digit number manifestation.

3. A converter for producing a voltage across a pair of output terminals that is a non-linear function of a multiple digit input number manifestation, said apparatus comprising a first group of resistors connected at one end to one of the output terminals, a source of potential having one end connected to the other of the output terminals, switching means for selectively coupling the respective resistors to one or the other of the two ends of the potential source in response to the value of the most significant digit of said multiple digit number manifestation, a plurality of additional groups of resistors including one group for each of the remaining digits of said input number manifestation coupling one end of each of the resistors in said additional groups to said one of the output terminals to which the first group of resistors are connected, means for selectively coupling the respective resistors of said additional groups to one or the other of of the two ends of the potential source in response to the value of the remaining digits of said multiple digit number manifestation, attenuator means and switching means for connecting selected ones of the respective resistors in shunt between said other of the output terminals connected to the one end of the potential source and the common junction between said additional groups of resistors, and means for activating said last-named switching means to selectively couple a particular shunting resistor in response to the value of the most significant digit of said multiple digit number manifestation.

4. A converter for producing an analog voltage which varies non-uniformly with changes in the value of an input numerical quantity, said converter comprising a plurality of counters for registering the respective digits of the input quantity, a first decade adder circuit including a plurality of resistors and switching means for selectively coupling one of the resistors in series circuit with a potential source in response to the digit value stored in the converter, the output analog voltage being derived across the remaining resistors connected in shunt across said series circuit, the respective resistors having resistance values adapted to provide any predetermined relationship between the input digit stored on the associated counter and the resulting output voltage derived from the adder circuit, additional adder circuits associated respectively with the remaining counters, attenuator means coupling the outputs of the additional adder circuits to the output of said first decade adder circuit, said attenuator means including a plurality of resistors, one for each digital value stored in the counter associated with said first decade adder circuit, and means for selectively coupling one of said attenuator resistors in shunt across the output derived from said additional adder circuits in response to the digit value stored in the counter associated with said first decade adder circuit.

No references cited.